United States Patent
Kimishima

(10) Patent No.: US 11,552,534 B2
(45) Date of Patent: Jan. 10, 2023

(54) RESOLVER DEVICE AND ROTATING ELECTRICAL MACHINE WITH RESOLVER DEVICE

(71) Applicant: Mitsubishi Electric Corporation, Tokyo (JP)

(72) Inventor: Akira Kimishima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 17/056,060

(22) PCT Filed: Jul. 3, 2018

(86) PCT No.: PCT/JP2018/025156
§ 371 (c)(1),
(2) Date: Nov. 17, 2020

(87) PCT Pub. No.: WO2020/008516
PCT Pub. Date: Jan. 9, 2020

(65) Prior Publication Data
US 2021/0211021 A1    Jul. 8, 2021

(51) Int. Cl.
*G01D 5/20* (2006.01)
*H02K 11/225* (2016.01)
(Continued)

(52) U.S. Cl.
CPC ........... *H02K 11/225* (2016.01); *H02K 5/225* (2013.01); *H02K 24/00* (2013.01); *G01D 5/2046* (2013.01); *H02K 2213/03* (2013.01)

(58) Field of Classification Search
CPC ............ H02K 24/00; H02K 7/00; H02K 7/20; H02K 11/00; H02K 11/22; H02K 11/225;
(Continued)

(56) References Cited

U.S. PATENT DOCUMENTS

| 2008/0024021 A1 | 1/2008 | Tsukashima et al. |
| 2013/0271121 A1 | 10/2013 | Ura |
| 2017/0199057 A1 | 7/2017 | Morita et al. |

FOREIGN PATENT DOCUMENTS

| DE | 102012223283 | * | 6/2014 | ............. H02K 24/00 |
| JP | 4558036 B2 | | 10/2010 | |

(Continued)

OTHER PUBLICATIONS

Notice of Reasons for Refusal dated Oct. 26, 2021 from the Japanese Patent Office in JP Patent Application No. 2020-528564.
(Continued)

*Primary Examiner* — Tran N Nguyen
(74) *Attorney, Agent, or Firm* — Sughrue Mion, PLLC; Richard C. Turner

(57) ABSTRACT

In order to improve the angle detection accuracy, when an exciting order is 2, a double axial angle is 5, and the number of resolver teeth is 8, an inner diameter deformation order is one of 4, 6, 7, 8, or 9, when the exciting order is 5, the double axial angle is 4, and the number of resolver teeth is 10, the inner diameter deformation order is one of 3, 5, 7, 9 or 10, when the exciting order is 3, the double axial angle is 4, and the number of resolver teeth is 12, the inner diameter deformation order is one of the 2, 3, 5, 6, 7, 9, 10, 11 or 12, and the resolver stator is fixed to the resolver device mounting part by the number of fixing points corresponding to any one of the inner diameter deformation order.

20 Claims, 14 Drawing Sheets

(51) Int. Cl.
*H02K 5/22* (2006.01)
*H02K 24/00* (2006.01)

(58) Field of Classification Search
CPC ............ H02K 5/00; H02K 5/22; H02K 5/225; G01D 5/20; G01B 7/00; G01B 7/30
See application file for complete search history.

(56) References Cited

FOREIGN PATENT DOCUMENTS

| | | |
|---|---|---|
| JP | 2013-221740 A | 10/2013 |
| JP | 2015-089177 A | 5/2015 |
| JP | 5728704 B2 | 6/2015 |
| JP | 2016-059160 A | 4/2016 |
| WO | 2016/027290 A1 | 2/2016 |

OTHER PUBLICATIONS

Extended European Search Report dated Jun. 4, 2021 From European Patent Office in EP Patent Application No. 18925487.3.
International search report for PCT/JP2018/025156 dated Sep. 25, 2018.
Communication dated May 17, 2022 from the Japanese Patent Office in Application No. 2020-528564.

\* cited by examiner

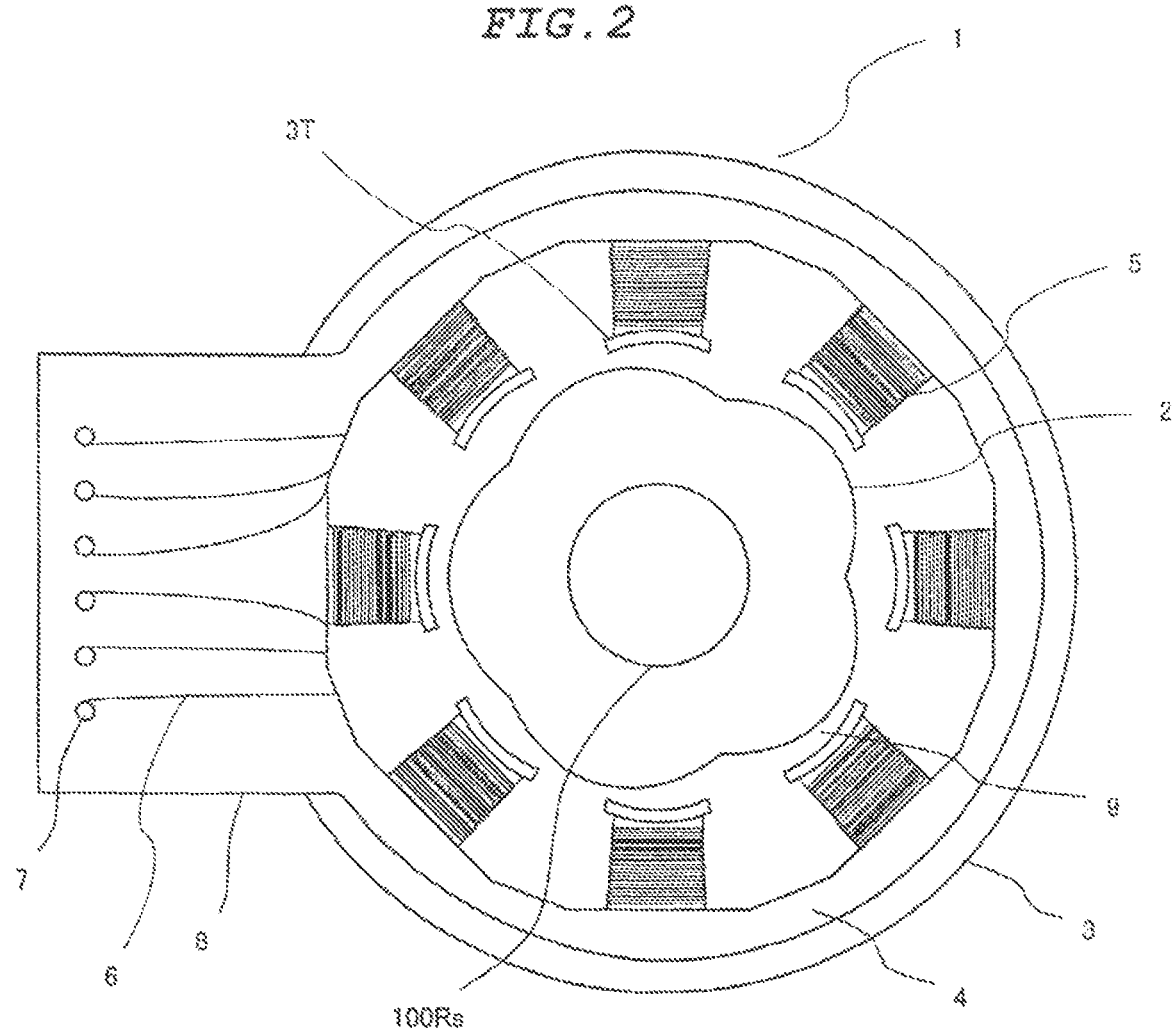

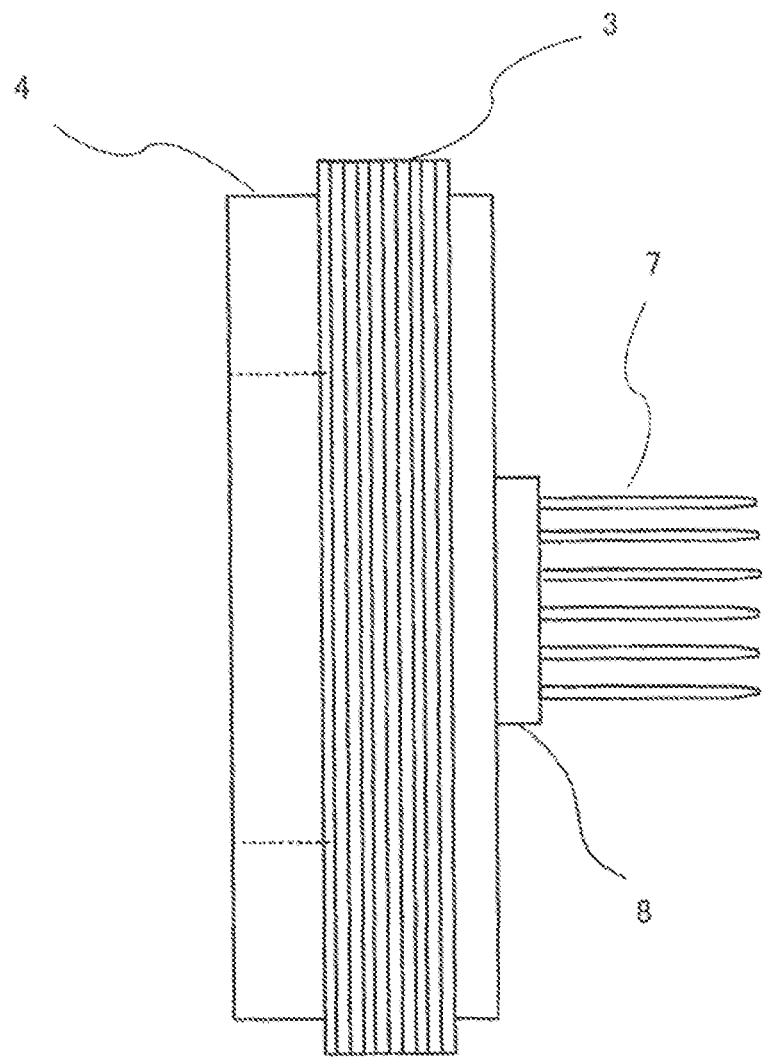

FIG. 4B
Exciting waveform of the resolver exciting winding excited by the exciting power source
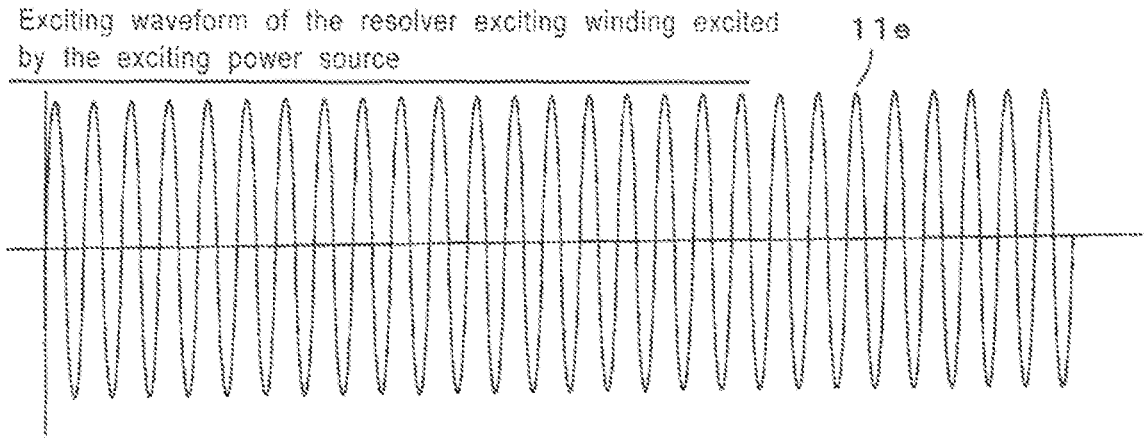
Output waveform of the resolver output Sin winding
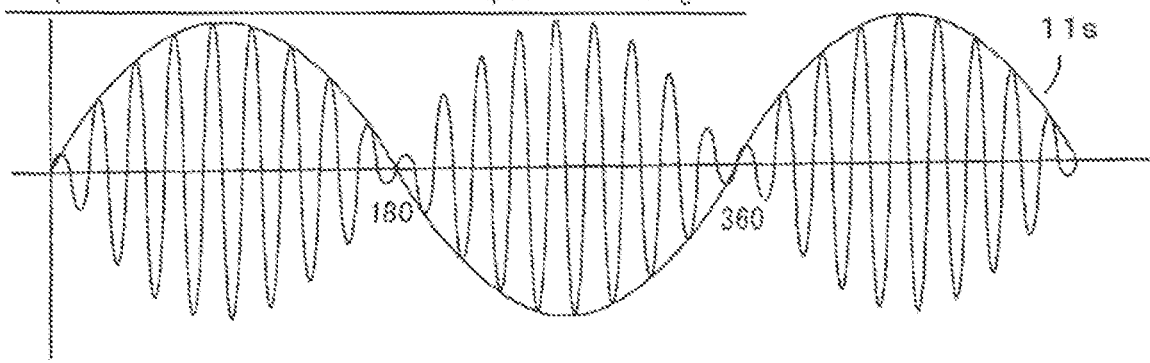
Output waveform of the resolver output Cos winding
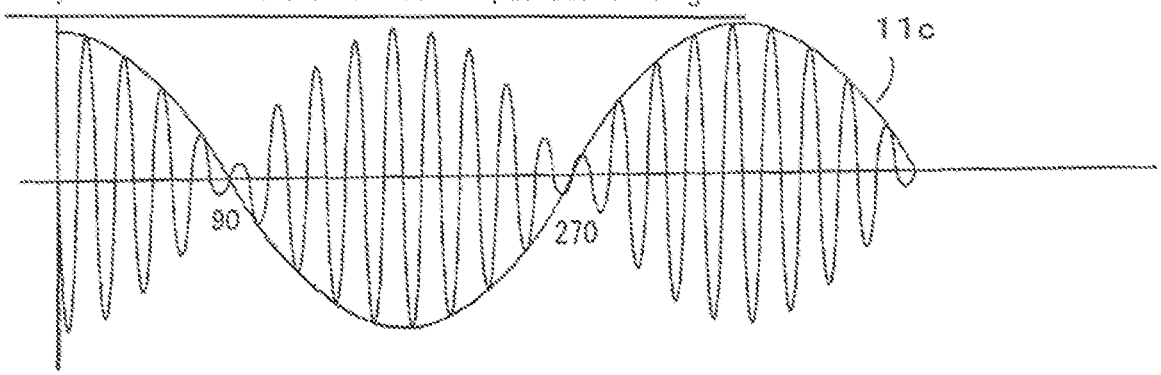

RESOLVER DEVICE AND ROTATING ELECTRICAL MACHINE WITH RESOLVER DEVICE

CROSS-REFERENCE TO RELATED APPLICATIONS

This application is a National Stage of International Application No. PCT/JP2018/025156 filed Jul. 3, 2018.

TECHNICAL FIELD

The present application relates to a resolver device and a rotating electrical machine with resolver device, in particular, it relates to a structure for mounting the resolver device to a mounting part.

BACKGROUND ART

For example, a conventional resolver device is provided with a fixing member that supports the outside part of the resolver stator, in order to ensure mounting accuracy, positioning is performed by the recess part of the stator and the protruding part of the retaining member, the fixing member are secured to the motor case with bolts. Further, in order to improve the detection accuracy, a shield member is configured around the perimeter of the resolver device, and the resolver device is fixed to the motor case via the shield member when attached.

[Patent Literature 1] JP 5728704 B2
[Patent Literature 2] JP 4558036 B2

DISCLOSURE OF INVENTION

Technical Problem

In a conventional installation structure of a resolver device disclosed in the Patent Literature 1, there is a possibility of distortion of the stator for winding the winding due to the installation, and as a result, there is a possibility that the angle detection accuracy cannot be improved. In the Patent Literature 2, additional components can be added to reduce distortion, but considering the strength of the shield plate which is a thin plate, and the stator which is a thick stator, the strain reduction is unlikely to be efficient, therefore the effects of distortion has to be further controlled.

The present application discloses a technology made in view of the above circumstances, and an object thereof is to improve the angle detection accuracy.

Solution to Problem

The resolver device disclosed in the present application is provided with a resolver stator having a resolver teeth wound with an exciting winding and an output winding, and a resolver rotor surrounded by the resolver stator and rotated by a rotation shaft are provided, wherein the resolver stator is fixed to the resolver device mounting part at two or more points, when an exciting order, which is the number of times to excite the exciting windings during a period of one rotation of the resolver rotor, is 2, a double axial angle, which is the number of times to generate an output signal for one rotation of the resolver rotor, is 5, and the number of the resolver teeth is 8, an inner diameter deformation order, which is the number of inner diameter deformation points of the resolver stator due to the circumferential fixing points of the resolver stator to the resolver device mounting part, is one of 4, 6, 7, 8, or 9, when the exciting order is 5, the double axial angle is 4, and when the number of resolver teeth is 10, the inner diameter deformation order is one of 3, 5, 7, 9 or 10, when the exciting order is 3, the double axial angle is 4, and the number of resolver teeth is 12, the inner diameter deformation order is one of 2, 3, 5, 6, 7, 9, 10, 11 or 12, the resolver stator is fixed to the resolver device mounting part by the number of fixing points corresponding to any one of the inner diameter deformation order.

Advantageous Effects of Invention

According to the resolver device disclosed in the present application, distortion of the detection waveform due to distortion of the stator at the time of installation of the resolver device can be reduced and the angle detection accuracy can be improved.

BRIEF DESCRIPTION OF DRAWINGS

FIG. 2 is a view showing the first embodiment of the present application, and is a front view showing an example of a resolver device to which the technology of the present application can be applied.

FIG. 3 is a view showing the first embodiment of the present application, and is a side view of the resolver device exemplified in FIG. 2.

FIG. 4B is a view showing the first embodiment of the present application, and illustrates an exciting waveform of the resolver exciting winding excited by an exciting power supply, an output waveform of a resolver output sin winding, and an output waveform of a resolver output cos winding in the principle diagram of FIG. 4A.

DESCRIPTION OF EMBODIMENTS

First Embodiment

Figure 1:
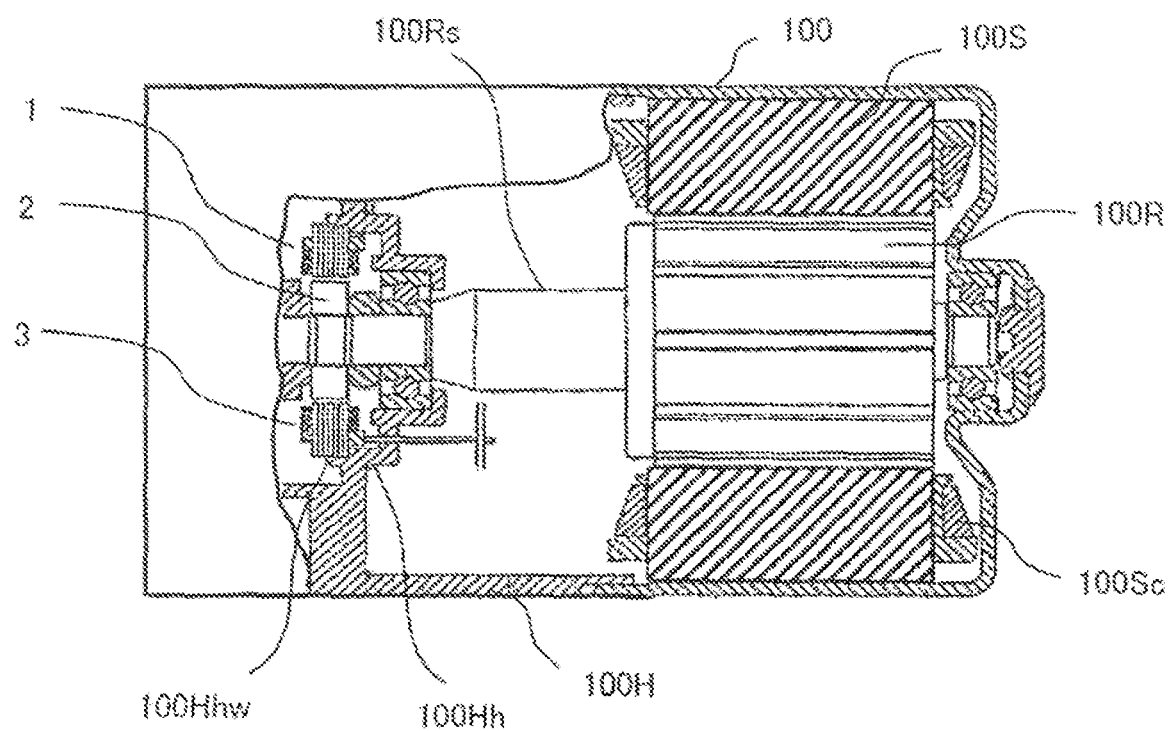
FIG. 1 is a view showing a first embodiment of the present application, and is a schematic structural diagram showing an example of a rotating electrical machine with a resolver device in a partial cross section.

The first embodiment of the present application will be described below with reference to FIGS. 1 to 11C.

In FIGS. 1 to 11C, a resolver device 1, a resolver rotor 2 of the permanent magnet, a resolver stator 3, 8 resolver teeth 3T, a center line 3Tc of the resolver tooth 3T, a resolver bobbin 4, a resolver winding 5, a winding end 6 of the resolver winding 5, a resolver terminal 7, a resolver terminal block 8, a resolver air gap 9, a resolver exciting winding 10e, a resolver output sin winding 10s, a resolver output cos winding 10c, an exciting waveform 11e, a resolver output sin waveform 11s, a resolver output cos waveform 11c, a plurality of resolver caulking parts (swaging parts) 12a, 12b, 12c, 12d, 12e, 12f, 12g, 12h, 12i, a plurality of resolver protruding parts 13a, 13b, 13c, 13d, 13e, 13f, 13g, 13h, 13i, a rotating electrical machine 100, a rotating electrical machine housing 100H, a resolver storage part 100Hh which is formed in the rotating electrical machine housing and is a predetermined part for mounting the resolver device inside the rotating electrical machine housing, a rotor 100R of the rotating electrical machine, a shaft 100Rs of the rotating electrical machine, a stator 100S of the rotating electrical machine, and a stator coils 100Sc of the rotating electrical machine are exemplified as illustrated in the figures.

Figure 4A:
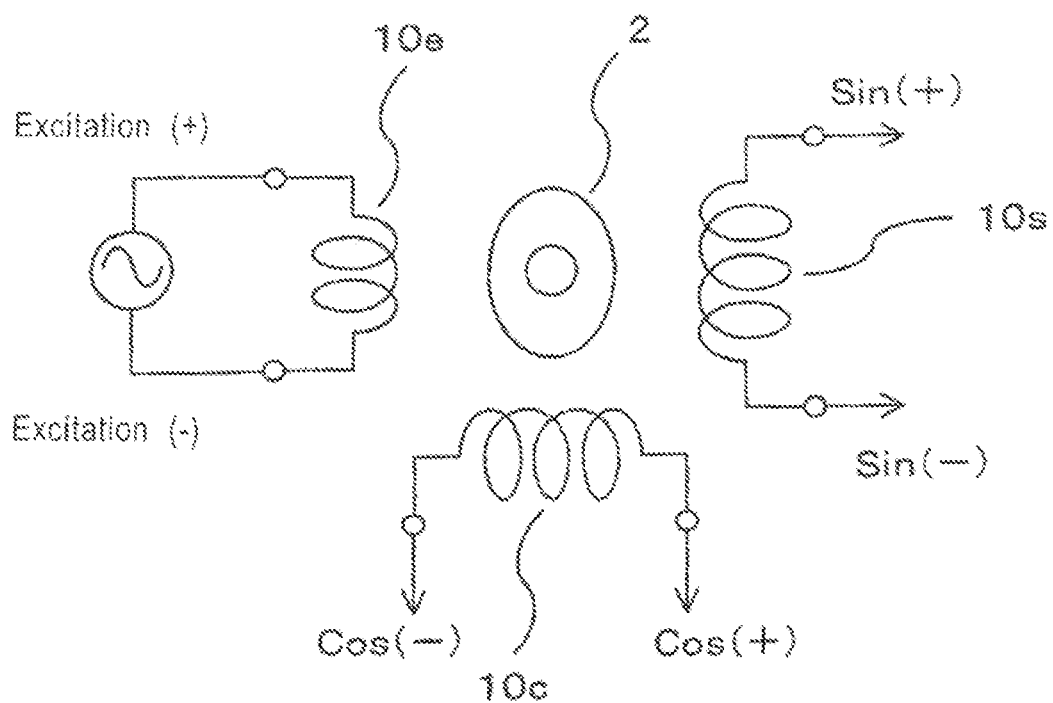
FIG. 4A is a view showing the first embodiment of the present application, and is a principle diagram of a resolver device including an exciting winding and an output winding (sin winding & cos winding).

The figure of the principle of the resolver device is illustrated in FIG. 4A, the resolver exciting waveform 11e of the resolver exciting winding 10e excited by the exciting power source in FIG. 4A, the resolver output sin waveform 11s of the resolver output sin winding 11s, and the resolver output cos waveform 11c of the resolver output cos winding 10c are illustrated in FIG. 4B, since the contents illustrated in FIGS. 4A and 4B are well known, the detailed description of those contents will be omitted.

First, before specifically describing the first embodiment of the present application with reference to the drawings, the double axial angle will be briefly described.

In the resolver device 1, the resolver winding 5 is wound around the resolver teeth 3T provided on the resolver stator 3. As the resolver winding 5, three types of coils, which are the exciting winding 10e generating the exciting waveform 11e, the sin winding 10s generating the sin waveform 11s which is a resolver output signal, and the cos winding 10c generating the cos waveform 11c which is a resolver output signal are wound. The resolver rotor 2 is attached to the shaft of the rotating electrical machine 100Rs in the central hole of the resolver stator 3. According to the irregularity of the outer peripheral surface of the resolver rotor 2 (refer to the irregularity shown in the drawing), and depending on the rotation of the resolver rotor 2 of the permanent magnet, the rotation angle is detected from the phase relationship between the sin waveform 11s and the cos waveform 11c depending on the exciting waveform 11e. Further, a type in which an output signal for one rotation is generated by one rotation of the resolver rotor 2 is called 1X, and a type in which an output signal for two rotations is generated by one rotation is called 2X, similarly, a type in which an output signal for four rotations is generated is called 4X, these 1X, 2X, and 4X are called double axial angle. In other words, the number of times that the output signal is generated for one revolution of the resolver rotor 2 is called double axial angle. This double axial angle is often determined in relation to the pole diagonal of the motor.

Next, regarding the exciting winding, the number of times of excitation for one revolution of the resolver rotor 2 is called exciting order. In other words, the number of times that the resolver exciting winding 10e is excited during one revolution of the resolver rotor 2 is called exciting order. This exciting order is determined by the specifications of the output winding together with the double axial angle and the number of the resolver teeth 3T.

Further, when the resolver device 1 is fixed to the resolver device mounting part, whether or not a part of the resolver stator 3 in the resolver device 1 is fixed in several points is called inner diameter deformation order. For example, in the case of fixing at two points, it is conceivable that the resolver stator 3 is distorted and the inner diameter of the resolver stator 3 is distorted in an oval shape due to the positions of fixing at two places. In this case, the inner diameter distortion of the resolver stator 3 is referred to as second inner diameter deformation. Further, the distortion of the inner diameter in the case of fixing the five points is referred to as the fifth inner diameter deformation.

In the resolver device 1 of the first embodiment, in the example shown in FIGS. 2 and 3, the resolver rotor 2 has five concave and convex parts on the outer periphery as shown in the drawing, and the double axial angle is 5X.

If the rotating electrical machine 100 has 10 poles and 12 slots, it becomes a 5 poles diagonal. In other words the double axial angle (5X) of the resolver device 1 and the magnetic counter pole (5 poles diagonal) of the rotating electrical machine 100 are the same.

The resolver device 1 is mainly composed of the resolver stator 3 formed by laminating a plurality of thin steel plates, the resolver winding 5, and the resolver bobbin 4 for winding the resolver winding 5.

The resolver teeth 3T are arranged on the resolver stator 3 so as to extend in the inner diameter direction at eight points as illustrated in FIG. 2. Further, the 8 resolver teeth 3T are arranged at equal intervals in the circumferential direction.

The resolver winding is provided with the exciting winding 10$e$, the sin winding 10$s$ which is a resolver output winding, and the cos winding 10$c$ which is a resolver output winding, each of which is wound around the resolver teeth 3T, for a total of three coils, the total of 6 winding ends of a resolver 6 at the beginning and the end of the winding of each coil extends to the left side in FIG. 2, each of them is connected to the corresponding resolver terminal 7. The above is the same structure as a conventional device.

When an exciting AC current passes through the exciting winding 10$e$ of the resolver stator 3 while the resolver rotor 2 is rotating, depending on the change in the amount of magnetic flux in the resolver air gap 9 between the resolver rotor 2 and the resolver teeth 3T, the resolver output waveforms, which are the sin waveform 11$s$ and the cos waveform 11$c$, change. Further, the resolver output waveform contains order components.

The order component is determined by the double axial angle, the exciting order, the number of the resolver teeth, and the inner diameter deformation order, further, the double axial angle, the exciting order, and the number of the resolver teeth depend on the resolver (rotating electrical machine) specifications, the inner diameter deformation order is determined by the number of fixed points in the circumferential direction of the resolver stator 3.

Next, when fixing the resolver device 1 to the resolver storage part (resolver device mounting part) 100Hh of the housing 100H of the rotating electrical machine 100, it is fixed by a fixing means such as a screw or caulking (swaging), but there is a possibility that distortion may occur on the inner diameter side of the resolver stator 3 due to the fixing, this distortion may cause deformation of the inner diameter part of the resolver stator 3. For example, if there are two fixing points in the circumferential direction of the resolver stator 3 to the resolver device mounting part 100Hh, as a number of an inner diameter deformation points in the circumferential direction is two, it is called twice inner diameter deformation points, and if there are three fixing points, it is called third inner diameter deformation points.

Depending on the robustness of the rotation angle detection with respect to the inner diameter deformation order of the resolver stator 3, which is the number of inner diameter deformation points of the resolver stator 3 due to the circumferential fixing position of the resolver stator 3 to the resolver device mounting part 100Hh, the following characteristics are derived as a result of qualitative analysis by experiments and simulations.

Figure 11A:
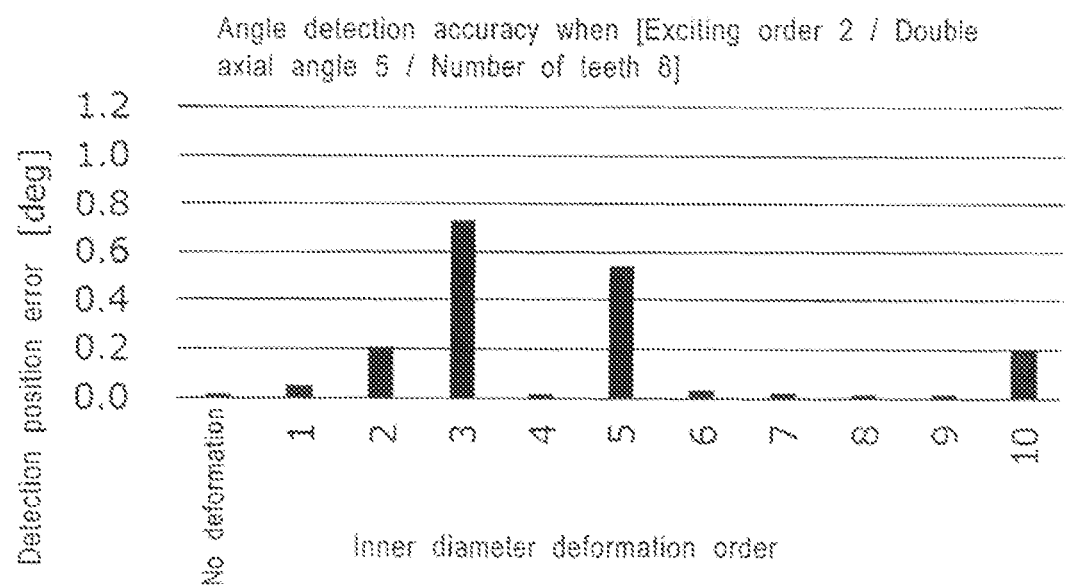
FIG. 11A is a view showing the first embodiment of the present application, and is a diagram showing the angle detection accuracy for each inner diameter deformation order when the exciting order is 2, the double axial angle is 5, and the resolver teeth number is 8.
Figure 11B:
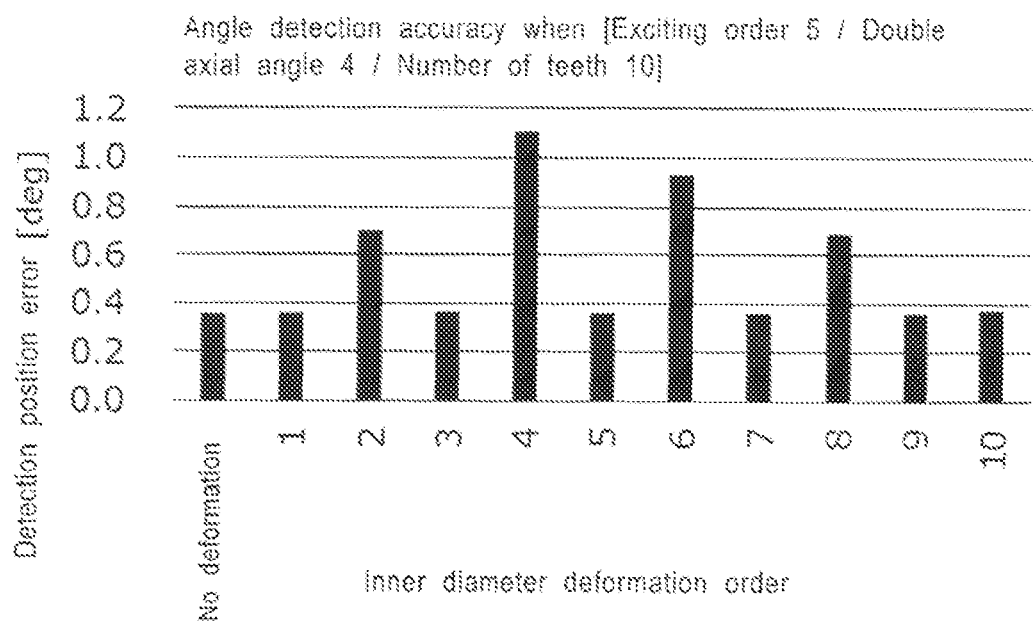
FIG. 11B is a view showing the first embodiment of the present application, and is a diagram showing the angle detection accuracy for each inner diameter deformation order when the exciting order is 5, the double axial angle is 4, and the resolver teeth number is 10.
Figure 11C:
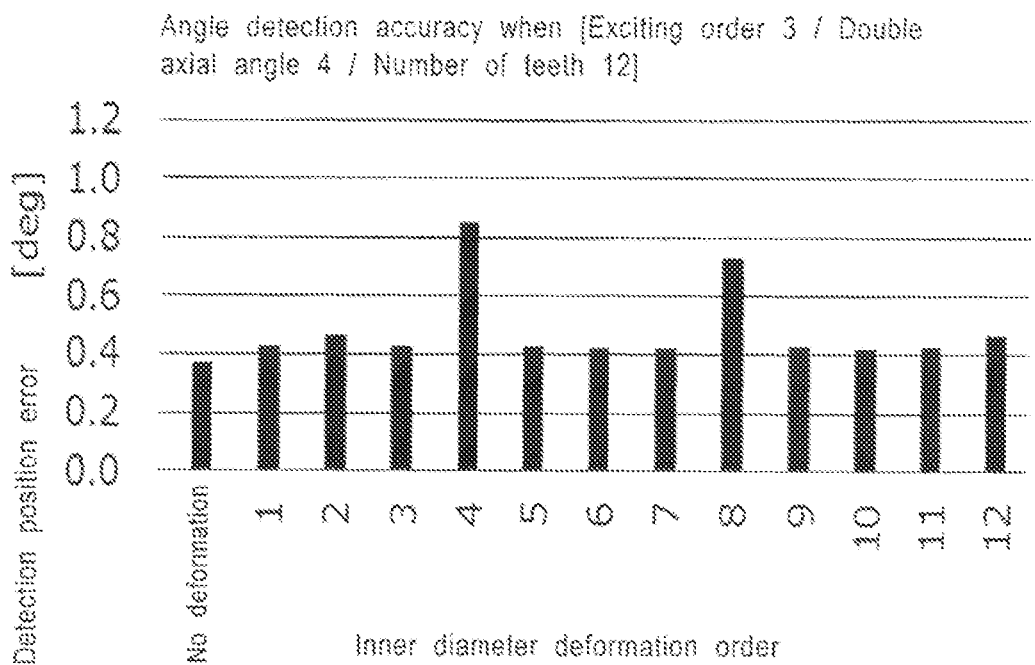
FIG. 11C is a view showing the first embodiment of the present application, and is a diagram showing the angle detection accuracy for each inner diameter deformation order when the exciting order is 3, the double axial angle is 4, and the resolver teeth number is 12.

When the exciting order (the number of times to excite the exciting windings 10$e$ during a period of one rotation of the resolver rotor 2), is 2, the double axial angle (the number of times to generate an output signal for one rotation of the resolver rotor 2) is 5, and the number of resolver teeth is 8, the inner diameter deformation order (the number of inner diameter deformation point of the resolver stator due to the circumferential fixing points of the resolver stator to the resolver device mounting part 100Hh) is one of 4, 6, 7, 8, or 9 according to FIG. 11A, when the exciting order is 5, the double axial angle is 4, and when the number of resolver teeth is 10, the inner diameter deformation order is one of 3, 5, 7, 9 or 10 according to FIG. 11B, and when the exciting order is 3, the double axial angle is 4, and the number of resolver teeth is 12, the inner diameter deformation order is one of 2, 3, 5, 6, 7, 9, 10, 11 or 12 according to FIG. 11C, it becomes possible to suppress the deterioration of the accuracy of the angle error and accurately acquire the detected angle even when the order distortion occurs in the stator.

As shown in FIG. 11A, FIG. 11B, and FIG. 11C, the detected angle cannot be acquired accurately for orders other than the inner diameter deformation orders.

Figure 5:
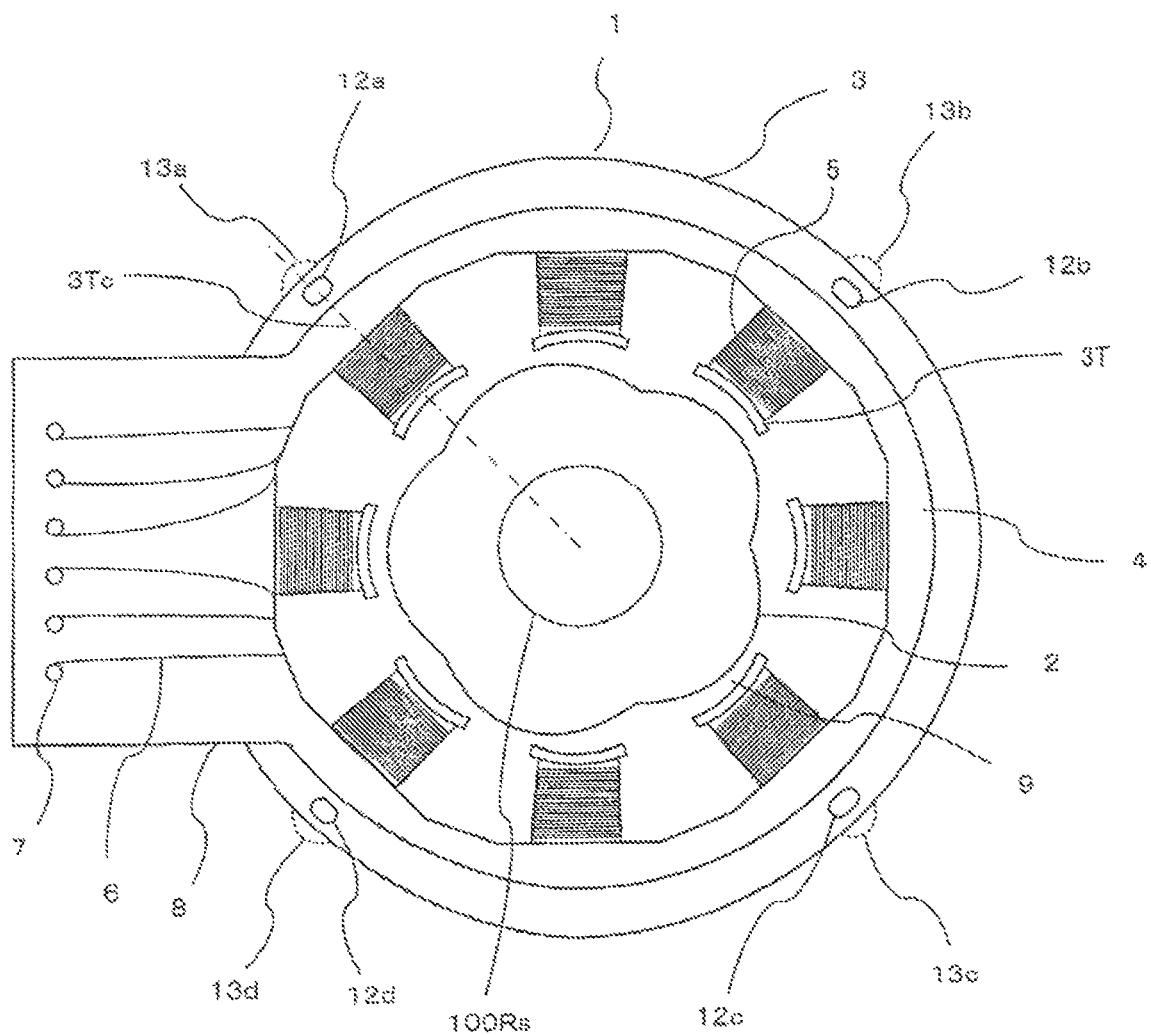
FIG. 5 is a view showing the first embodiment of the present application, and is a front view showing an example of a mounting structure for suppressing the distortion of the stator and reduces the distortion of the distortion of the detected waveform when the resolver device is mounted on the mounting part, and showing a specific first example in which the exciting order is 2, the double axial angle is 5, the number of resolver teeth is 8, and the inner diameter deformation order is 4.
Figure 6:
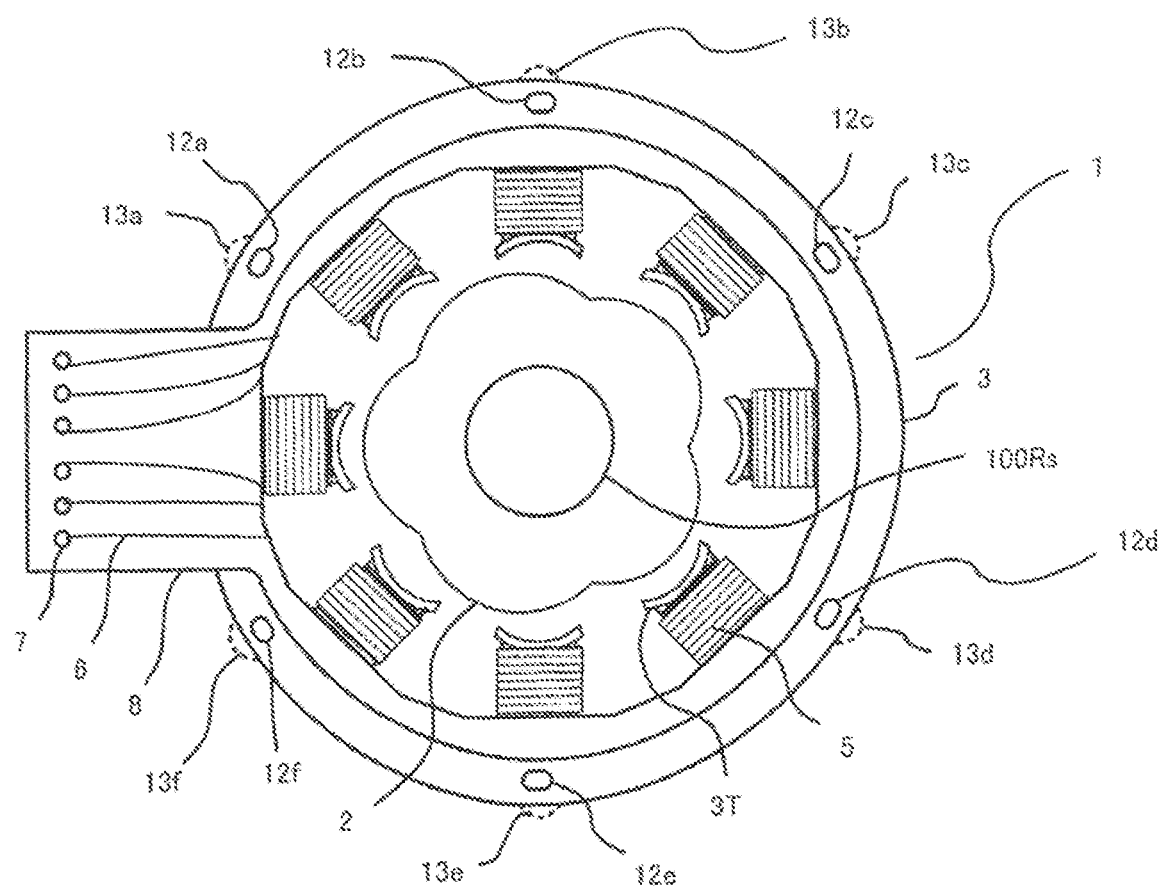
FIG. 6 is a view showing the first embodiment of the present application, and is a front view of the second example of the resolver device showing a specific example in which the inner diameter deformation order is changed from 4 to 6 with respect to FIG. 5 (first example).
Figure 7:
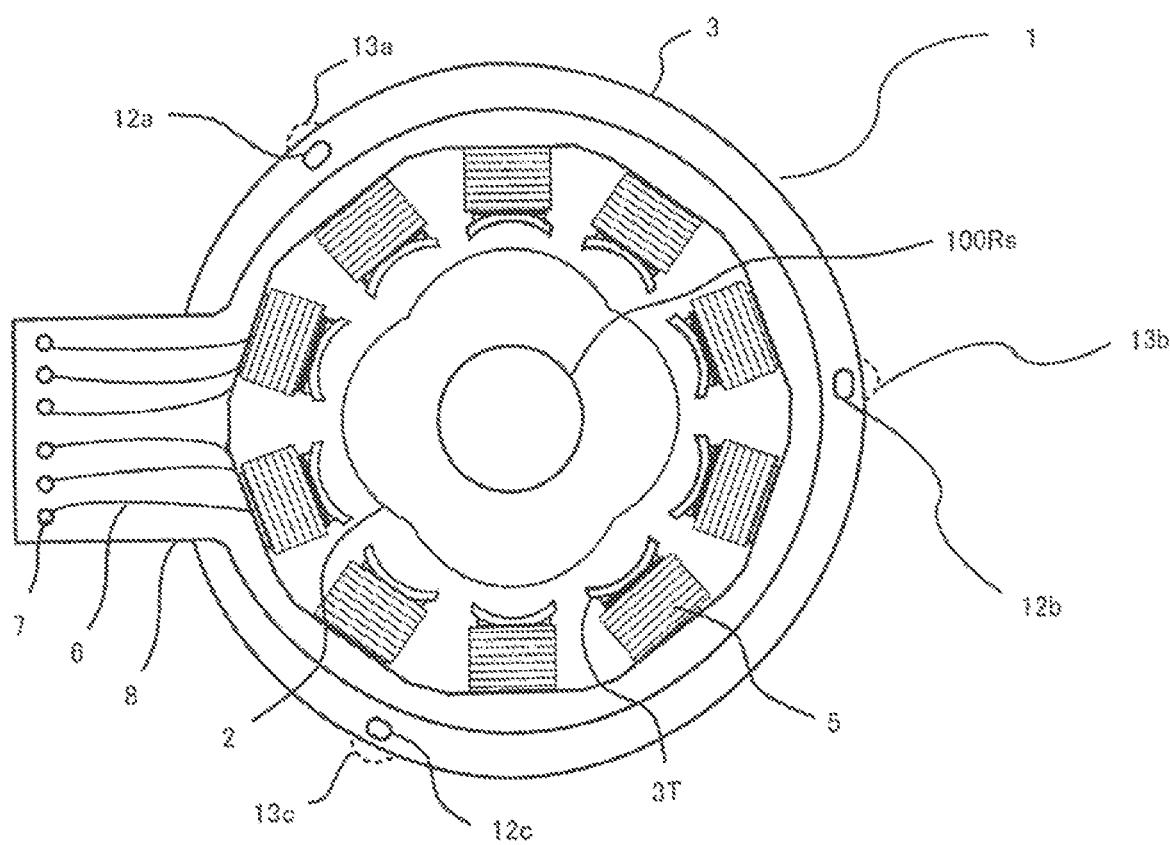
FIG. 7 is a view showing the first embodiment of the present application, and is a front view of the third example of the resolver device showing a specific example in which the exciting order is changed from 2 to 5, the double axial angle is changed from 5 to 4, and the number of resolver teeth is changed from 8 to 10, and in which the inner diameter deformation order is 3 with respect to FIG. 5 (first example).
Figure 8:
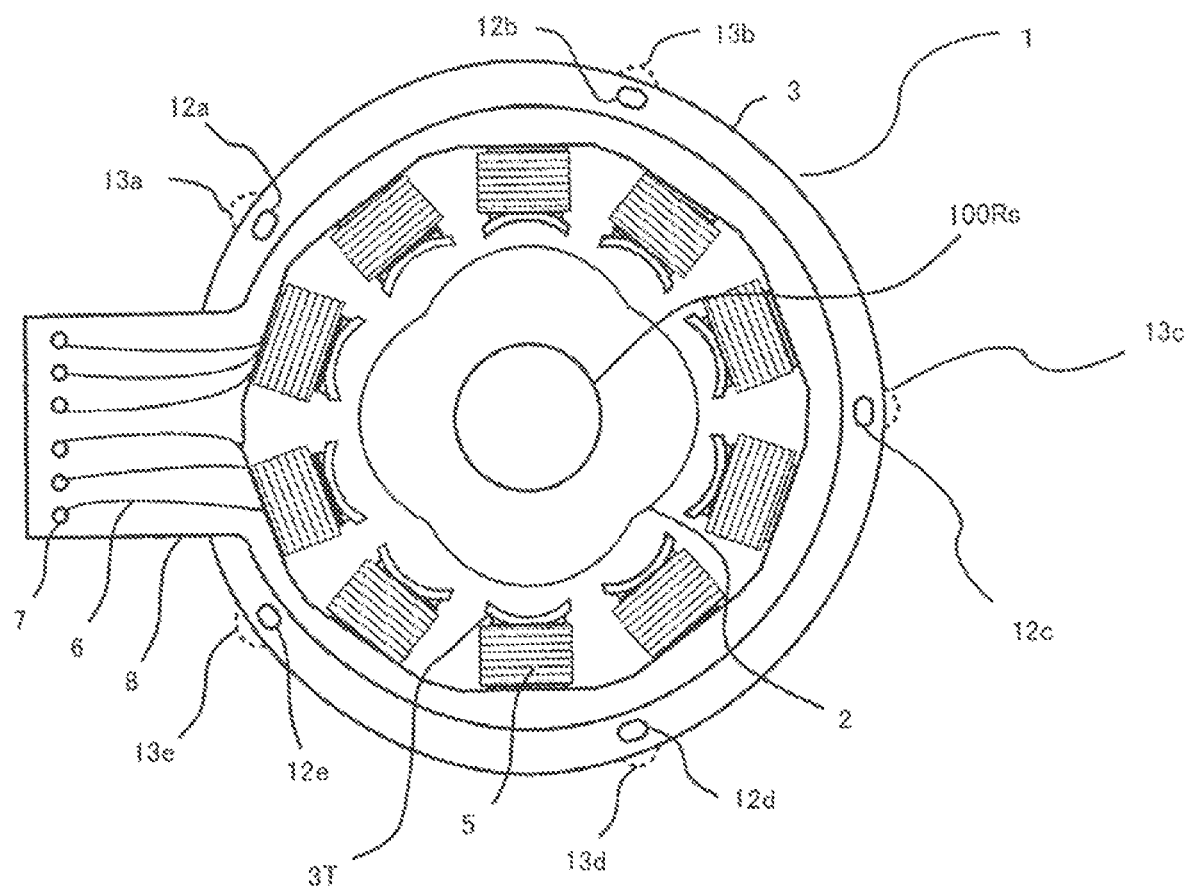
FIG. 8 is a view showing the first embodiment of the present application, and is a front view of the fourth example of the resolver device showing a specific example in which the inner diameter deformation order is changed from 3 to 5 with respect to FIG. 7 (third example).

The first embodiment of the present application is an example in which fixing to the resolver device mounting part is performed by caulking (swaging), as examples of specific structures, example 1 is shown in FIG. 5, example 2 is shown in FIG. 6, example 3 is shown in FIG. 7, example 4 is shown in FIG. 8, and example 5 is shown in FIG. 6, respectively. Regarding examples 2, 3, 4, 5, and 6, examples of other combinations of the exciting order, the double axial angle, the number of teeth, and the inner diameter deformation order in example 1 are illustrated.

EXAMPLE 1

In the example 1, based on FIG. 2, FIG. 5 shows an example of a case where the number of points of fixation of the resolver stator 3 to the resolver device mounting part (corresponding to the inner diameter deformation order) is selected as 4 (4th order).

FIG. 5 is a front view showing an example of a specific mounting structure for suppressing the distortion of the stator and reduces the distortion of the detected waveform when the resolver device is mounted on the resolver device mounting part, and showing the specific example 1 in which the exciting order is 2, the double axial angle is 5, the number of resolver teeth is 8, and the inner diameter deformation order is 4.

By caulking (swaging) at 4 points the outer circumference of the resolver stator 3, the resolver caulking parts 12$a$, 12$b$, 12$c$, 12$d$ are provided at equal intervals in the circumferential direction of the resolver stator 3, due to this influence, as the resolver protruding parts 13$a$, 13$b$, 13$c$, and 13$d$ schematically indicated by the broken lines, the outer periphery of the resolver stator 3 partially protrudes the resolver caulking parts 12$a$, 12$b$, 12$c$, and 12$d$, and are in close contact and fixed to the inner peripheral surface of the resolver device mounting part (for example, the resolver device mounting part 100Hh in FIG. 1) according to these resolver protruding parts 13$a$, 13$b$, 13$c$, 13$d$.

Therefore, it can be fixed without additional parts for mounting and can output the detection waveform more accurately.

Further, it is believed that the caulking (swaging) may also cause distortion (not shown) in the direction of the inner diameter of the resolver stator 3. Here, the position of caulking (swaging) exists near the root (outer radial direction) of the resolver teeth 3T, but considering the magnetic path, in the root of the resolver teeth 3T, as the magnetic path separates in both directions along the outer circumference, as placing the caulking part on the center line 3Tc of the resolver teeth 3T has little effect on the deformation of the resolver stator 3 due to the caulking, it is better than providing a caulking part at other position on the outer peripheral of the resolver stator. In other words, at least one of the plurality of fixation points of the resolver device 1 to the resolver device mounting part should be located on the centerline 3Tc of the resolver teeth 3T.

If in the circumferential direction of the resolver teeth 3T, the size of the resolver caulking parts 12a, 12b, 12c, and 12d does not result in magnetic path saturation around the resolver stator 3, then the resolver caulking part does not have to be located on the centerline 3Tc of the resolver teeth 3T. Further, a flange is provided in the resolver stator 3 and a hole is drilled in its center, the structure may be constructed to secure the resolver stator 3 to the resolver device mounting part, such as the storage part 100Hh for the resolver device in the housing by screw tightening. As described above, around the periphery of the resolver stator, taking in consideration the aforementioned relationship, by determining the position of the fixing part that secures the resolver device to the resolver device mounting part, the angle detection accuracy can be improved.

EXAMPLE 2

This example 2 is a specific example in which the inner diameter deformation order is changed from 4 to 6 with respect to FIG. 5 (first embodiment), and is illustrated in FIG. 6 as a front view.

This example 2 is an example of a specific structure where the exciting order is 2, the double axial angle is 5, the number of resolver teeth is 8, and the inner diameter deformation order is 6, the resolver caulking (swaging) parts 12a, 12b, 12c, 12d, 12e, 12f and the resolver protruding parts 13a, 13b, 13c, 13d, 13e, 13f are illustrated in FIG. 6.

This example 2 also produces the same effect as example 1 on the same basis as example 1.

EXAMPLE 3

This example 3 is a specific example in which the inner diameter deformation order is 3, in which the exciting order is changed from 2 to 5, the double axial angle is changed from 5 to 4, and the number of teeth is changed from 8 to 10, with respect to FIG. 5 (first embodiment), and is illustrated in FIG. 7 as a front view.

This example 3 is an example of a specific structure where the exciting order is 5, the double axial angle is 4, the number of resolver teeth is 10, and the inner diameter deformation order is 3, the resolver caulking (swaging) parts 12a, 12b, 12c, and the resolver protruding parts 13a, 13b, 13c, are illustrated in FIG. 7.

This example 3 also produces the same effect as example 1 on the same basis as example 1.

EXAMPLE 4

This example 4 is a specific example in which the inner diameter deformation order is changed from 3 to 5 with respect to FIG. 7 (example 3), and is illustrated in FIG. 8 as a front view.

This example 4 is an example of a specific structure where the exciting order is 5, the double axial angle is 4, the number of resolver teeth is 10, and the inner diameter deformation order is 5, the resolver caulking (swaging) parts 12a, 12b, 12c, 12d, 12e, and the resolver protruding parts 13a, 13b, 13c, 13d, 13e, are illustrated in FIG. 8. This example 4 also produces the same effect as example 1 on the same basis as example 1.

EXAMPLE 5

Figure 9:
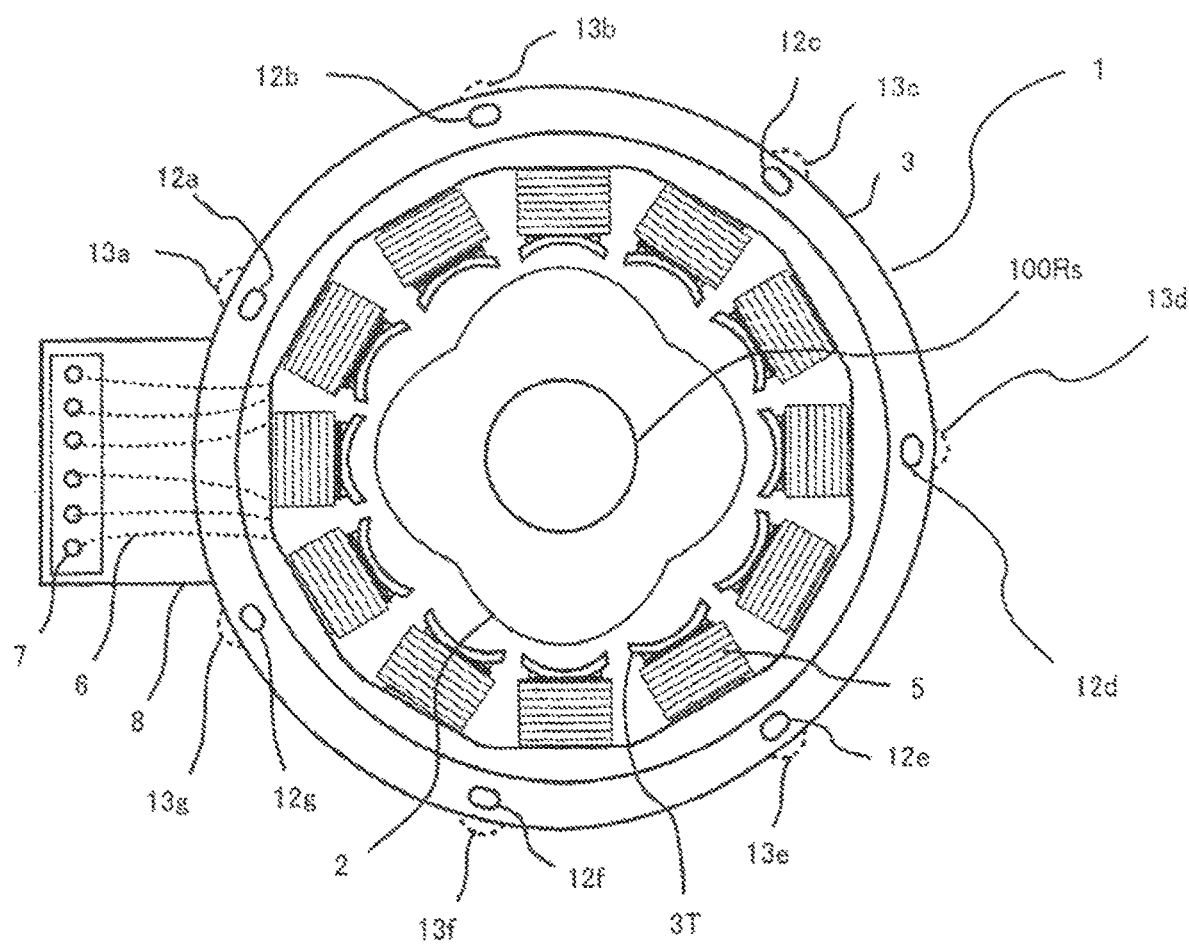
FIG. 9 is a view showing the first embodiment of the present application, and is a rear view of the fifth example of the resolver device showing a specific example in which the exciting order is changed from 5 to 3, the resolver teeth number is changed from 10 to 12 and the inner diameter deformation order is 7, with respect to FIG. 7 (third example).

This example 5 is a specific example in which the inner diameter deformation order is 7, in which the exciting order is changed from 5 to 3, the number of resolver teeth is changed from 10 to 12 with respect to FIG. 7 (example 3), and is illustrated in FIG. 9 as a front view.

This example 5 is an example of a specific structure where the exciting order is 3, the double axial angle is 4, the number of resolver teeth is 12, and the inner diameter deformation order is 7, the resolver caulking (swaging) parts 12a, 12b, 12c, 12d, 12e, 12f, 12g and the resolver protruding parts 13a, 13b, 13c, 13d, 13e, 13f, 13g are illustrated in FIG. 9.

This example 5 also produces the same effect as example 1 on the same basis as example 1.

EXAMPLE 6

This example 6 is a specific example in which the inner diameter deformation order is changed from 7 to 9 with respect to FIG. 9 (example 5), and is illustrated in FIG. 9 as a front view.

Figure 10:
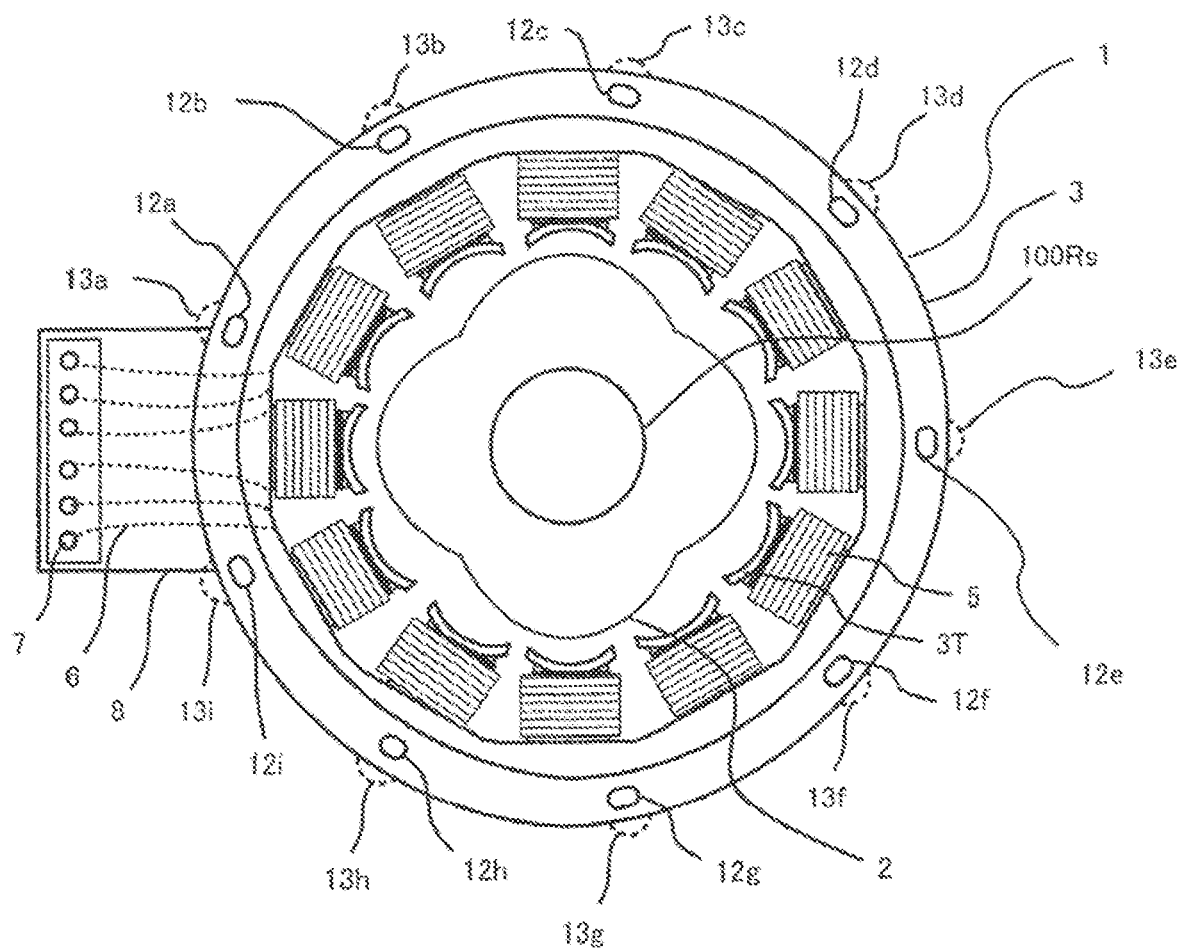
FIG. 10 is a view showing the first embodiment of the present application, and is a rear view of the sixth example of the resolver device showing a specific example in which the inner diameter deformation order is changed from 7 to 9 with respect to FIG. 9 (fifth example).

This example 6 is an example of a specific structure where the exciting order is 3, the double axial angle is 4, the number of resolver teeth is 12, and the inner diameter deformation order is 9, the resolver caulking (swaging) parts 12a, 12b, 12c, 12d, 12e, 12f, 12g, 12h, 12i and the resolver protruding parts 13a, 13b, 13c, 13d, 13e, 13f, 13g, 13h, 13i are illustrated in FIG. 10.

This example 6 also produces the same effect as example 1 on the same basis as example 1.

SECOND EMBODIMENT

Figure 12:
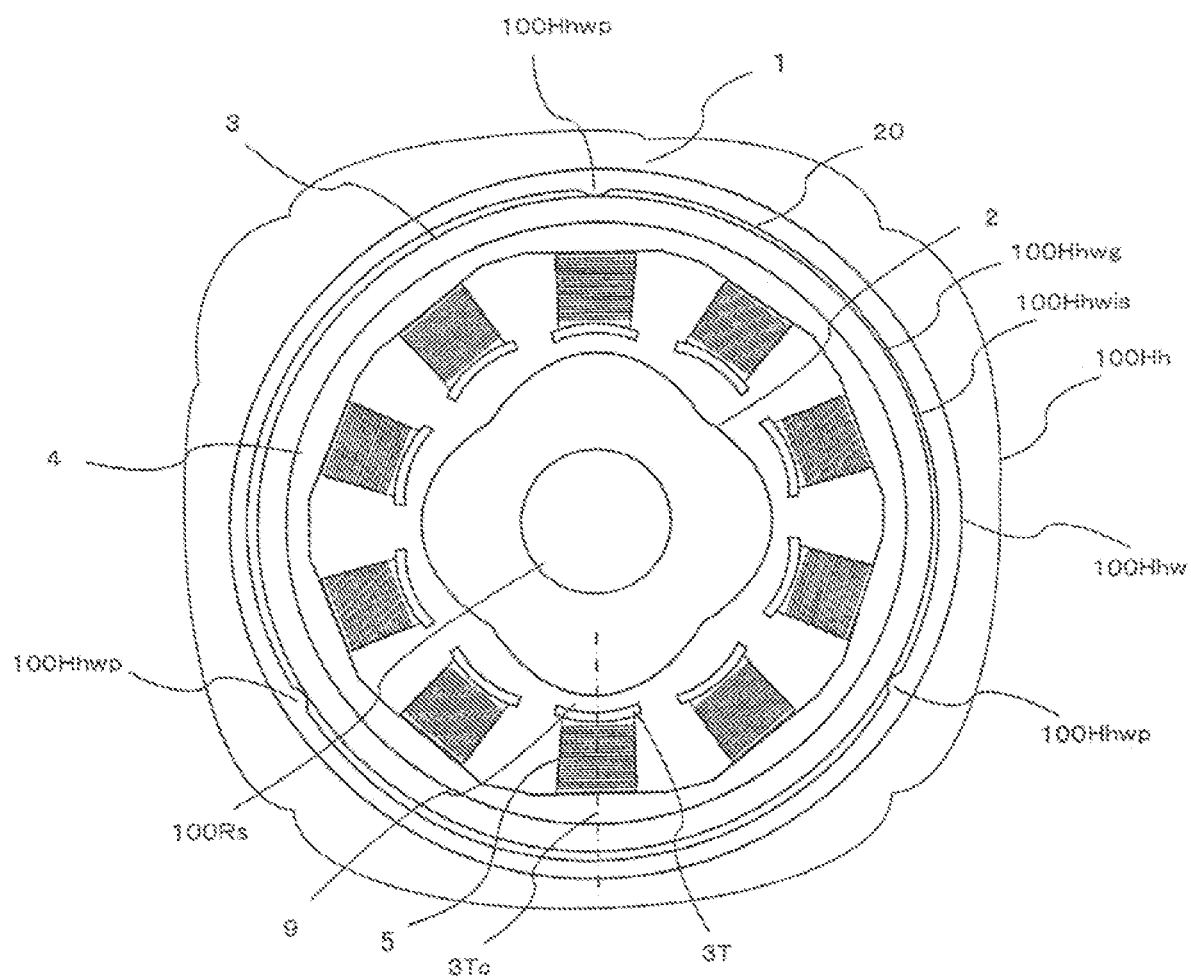
FIG. 12 is a view showing the second embodiment of the present application, and is a front view showing another example of the mounting structure for suppressing the distortion of the stator at the time of mounting the resolver device to the mounting part for the resolver device and reducing the distortion of the detected waveform.

The second embodiment will be described below with reference to FIG. 12. In the second embodiment, the rotating electrical machine 100 is constituted of a brushless type with 8 poles and 12 slots, and is an example of a case where the resolver rotor 2 of the resolver device 1 has 4 projections around the periphery of the resolver rotor 2 and a double axial angle 4.

The resolver stator 3 of the resolver device 1 has 10 resolver teeth 3T, as shown in the figure, and the exciting winding 10e (refer to FIG. 4A), the sin winding 10s (refer to FIG. 4A), which is a resolver output winding, and the cos winding 10c (refer to FIG. 4A), which is a resolver output winding are 3 coils wound in the resolver teeth 3T.

The resolver device 1 is also stored in the storage part 100Hh for the resolver device formed in the housing 100H of the rotating electrical machine 100. The resolver stator 3 of the resolver device 1 is surrounded by an inner surface 100Hhwis of a wall part 100Hhw of the storage part 100Hh for the resolver device.

In this second embodiment, the winding end of the resolver 6, the resolver terminal 7, and the resolver terminal block 8 illustrated in the first embodiment are omitted to show in the figure.

In the second embodiment, as the exciting order=5, the double axial angle=4, the number of resolver teeth=10, it is possible to set the inner diameter deformation order to 3 according to the above relationship. For this, the number of points for fixing the resolver device 1 to the resolver device mounting part (resolver storage part 100Hh) is set to 3, and 3 identically shaped projection 100Hhwp are provided at equal intervals on the side of the resolver device mounting part (resolver storage part 100Hh).

When the resolver device 1 is pressurized into the resolver storage part 100Hh formed in the housing 100H of the rotating electrical machine 100, the projection 100Hhwp may deform the resolver stator 3 in the inner diameter direction, but this variant is an unlikely relationship that may causes errors in the detection angle information, as described in the first embodiment.

Further, the outer surface of the resolver stator 3, which does not adhere to the projection 100Hhwp, has a predetermined clearance 100Hhwg formed so that it does not come into contact with the inner surface 100Hhwis of the wall part 100Hhw of the resolver storage part 100Hh of the resolver storage part formed in the rotating electrical machine housing 100H, this also ensures the alignment of stator 3 itself.

THIRD EMBODIMENT

Figure 13:
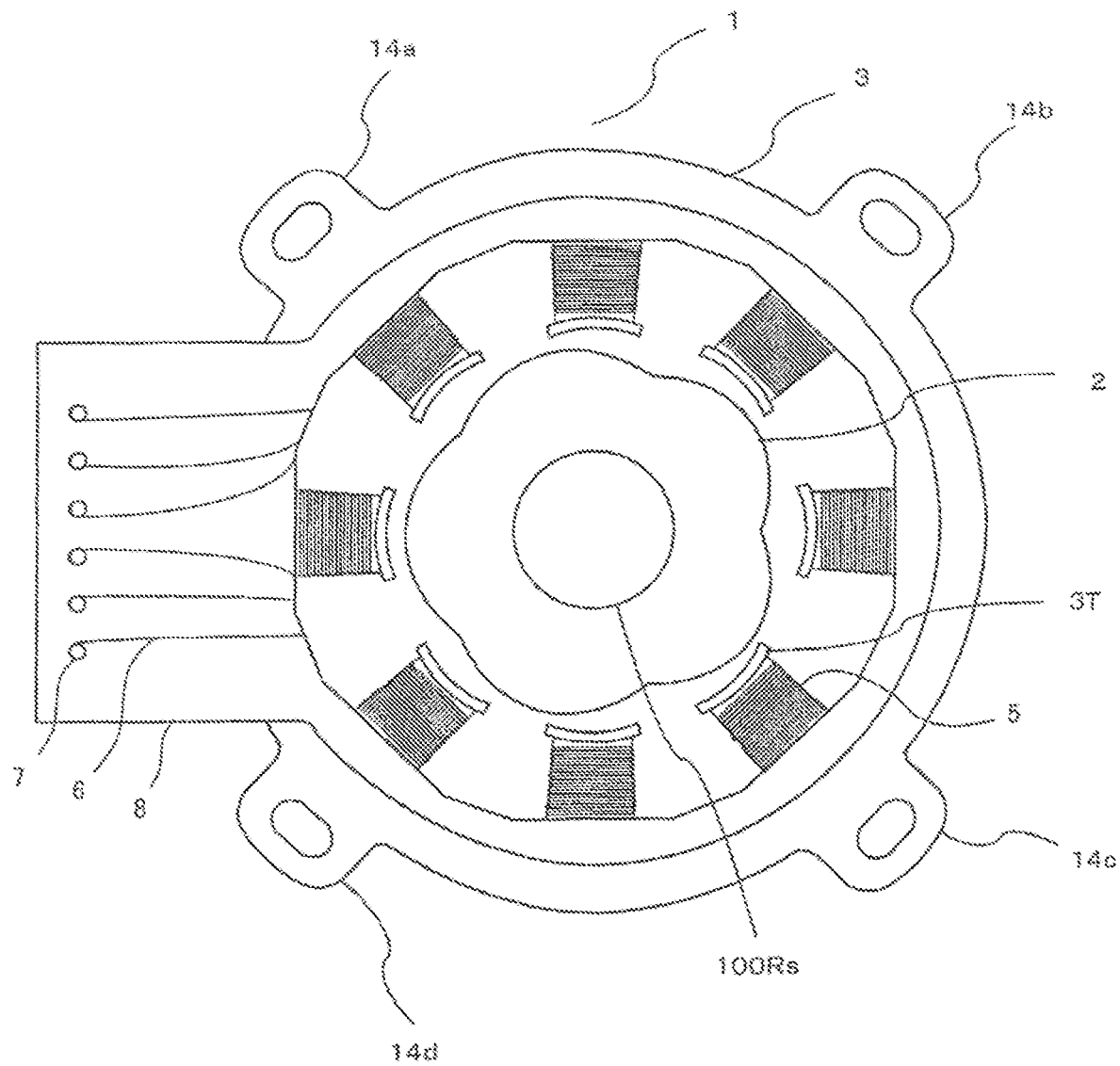
FIG. 13 is a view showing the third embodiment of the present application, and is a front view showing an example of a mounting structure that suppresses the distortion of the stator at the time of mounting the resolver device to the mounting part for the resolver device and reduces the distortion of the detected waveform.

The third embodiment will be described below with reference to FIG. 13. In the third embodiment, the rotating electrical machine 100 is of a brushless type with 10 poles and 12 slots, and is an example of a case where the resolver rotor 2 of the resolver device 1 has 5 projections around the periphery of the resolver rotor 2 and a double axial angle 5.

The resolver stator 3 of the resolver device 1 has 8 resolver teeth 3T, as shown in the figure, and the exciting winding 10e (refer to FIG. 4A), the sin winding 10s (refer to FIG. 4A), which is a resolver output winding, and the cos winding 10c (refer to FIG. 4A), which is a resolver output winding are 3 coils wound in the resolver teeth 3T.

The resolver device 1 is also stored in the resolver storage part 100Hh formed in the housing 100H of the rotating electrical machine 100, and is secured to the housing 100H by the flanges 14a, 14b, 14c and 14d provided on the outer circumference of the resolver stator 3 screwed down.

In the third embodiment, as the exciting order=2, the double axial angle=5, the number of resolver teeth=8, it is possible to set the inner diameter deformation order to 4 according to the above relationship. For this, the flanges 14a, 14b, 14c and 14d are provided on the outer circumference of the resolver stator 3, and is fixed to the resolver device mounting part for the resolver device 1 (resolver storage part 100Hh) with 4 screws.

At this time, the resolver stator 3 may be deformed by screwing, but this variant is unlikely and may causes errors in the detection angle information, as described in the first embodiment.

Further, in the third embodiment, when an angle error occurs due to a deviation in the mounting position of the resolver device, it can be corrected by removing and reassembling the screws.

The inner diameter deformation order is determined by considering the exciting order, the double axial angle and the output winding order determined by the number of teeth as described above, since the number of fixing points of the resolver device can be determined, the angle detection accuracy can be improved. Further, the resolver stator itself is not only flanged and caulked, the angle detection accuracy can be improved also by applying the resolver stator pressure in close contact with the resolver stator side by the projection of the wall part of the resolver storage part for the resolver device.

In the drawings, the same reference numerals indicate the same or corresponding parts.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment.

It is therefore understood that numerous modifications which have not been exemplified can be devised without departing from the scope of the present application. For example, at least one of the constituent components may be modified, added, or eliminated.

REFERENCE SIGNS LIST

1. Resolver device,
2. Resolver rotor,
3. Resolver stator,
4. Resolver tooth (teeth),
3Tc Center line of a (the) resolver tooth,
4. Resolver bobbin,
5. Resolver winding,
6. Winding end of a resolver,
7. Resolver terminal,
8. Resolver terminal block,
9. Resolver air gap,
10e Exciting winding,
10s Sin winding,
10c Cos winding,
11c Cos waveform,
11e Exciting waveform,
11s Sin waveform,
12a, 12b, 12c, 12d, 12e, 12f, 12g, 12h, 12i Caulking part (Swaging part),
13a, 13b, 13c, 13d, 13e, 13f, 13g, 13h, 13i Resolver protruding part,
14a, 14b, 14c, 14d Flange
100 Rotating electrical machine;
100H Rotating electrical machine housing,
100Hh Resolver storage part which is formed in the rotating electrical machine housing (resolver device mounting part),
100Hhw Wall part of the resolver storage part,
100Hhwg Predetermined clearance,
100Hhwis Inner circumferential surface of the wall part,
100Hhwp Projection,
100R Rotor of the rotating electrical machine,
100Rs Shaft of the rotating electrical machine,
100S Stator of the rotating electrical machine,
100Sc Stator coils of the rotating electrical machine.

The invention claimed is:

1. A resolver device comprising:
a resolver stator having resolver teeth wound with exciting windings and an output winding, and a resolver rotor surrounded by the resolver stator and rotated by a rotation shaft, wherein the resolver stator is fixed to a resolver device mounting part at two or more circumferential fixing points, wherein;
when an exciting order, the exciting order being a number of times to excite the exciting windings during a period of one rotation of the resolver rotor, is 2, a double axial angle, wherein the double axial angle is a number of times to generate an output signal for one rotation of the resolver rotor, is 5, and a number of the resolver teeth is 8, an inner diameter deformation order is one of 4, 6, 7, 8, or 9, wherein the inner diameter deformation order is a number of inner diameter deformation points of the resolver stator due to the circumferential fixing points of the resolver stator to the resolver device mounting part, when the exciting order is 5, the double axial angle is 4, and the number of resolver teeth is 10, the inner diameter deformation order is one of 3, 5, 7, 9 or 10, when the exciting order is 3, the double axial angle is 4, and the number of resolver teeth is 12, the inner diameter deformation order is one of 2, 3, 5, 6, 7, 9, 10, 11 or 12, and wherein;

the resolver stator is fixed to the resolver device mounting part by the number of circumferential fixing points corresponding to any one of said inner diameter deformation orders.

2. The resolver device according to claim 1 wherein the circumferential fixing points comprise a protruding part where the resolver stator protrudes partially toward the resolver device mounting part.

3. The resolver device according to claim 1 wherein the circumferential fixing points comprise a projection where the resolver device mounting part protrudes partially toward the resolver rotor.

4. The resolver device according to claim 1 wherein the circumferential fixing points comprise flanges provided on the outer periphery of the resolver stator and screwed to the resolver device mounting part.

5. The resolver device according to claim 1 wherein the two or more fixed points of the resolver stator are evenly spaced in the circumferential direction.

6. The resolver device according to claim 2 wherein the two or more fixed points of the resolver stator are evenly spaced in the circumferential direction.

7. The resolver device according to claim 3 wherein the two or more fixed points of the resolver stator are evenly spaced in the circumferential direction.

8. The resolver device according to claim 4 wherein the two or more fixed points of the resolver stator are evenly spaced in the circumferential direction.

9. The resolver device according to claim 1 wherein at least one of the circumferential fixing points of the resolver stator is located on the center line of the resolver teeth of the resolver stator.

10. The resolver device according to claim 2 wherein at least one of the circumferential fixing points of the resolver stator is located on the center line of the resolver teeth of the resolver stator.

11. The resolver device according to claim 3 wherein at least one of the circumferential fixing points of the resolver stator is located on the center line of the resolver teeth of the resolver stator.

12. The resolver device according to claim 5 wherein at least one of the circumferential fixing points of the resolver stator is located on the center line of the resolver teeth of the resolver stator.

13. The resolver device according to claim 6 wherein at least one of the circumferential fixing points of the resolver stator is located on the center line of the resolver teeth of the resolver stator.

14. The resolver device according to claim 7 wherein at least one of the circumferential fixing points of the resolver stator is located on the center line of the resolver teeth of the resolver stator.

15. A rotating electrical machine with a resolver device, wherein
the rotating electrical machine is provided with a housing, a stator built in the housing, and a rotor built in the housing, wherein
the resolver device according to claim 1, is fixed to the housing, and wherein the resolver rotor rotates according to the rotation of the rotor of the rotating electrical machine.

16. A rotating electrical machine with a resolver device, wherein
the rotating electrical machine is provided with a housing, a stator built in the housing, and a rotor built in the housing, wherein
the resolver device according to claim 2, is fixed to the housing, and wherein
the resolver rotor rotates according to the rotation of the rotor of the rotating electrical machine.

17. A rotating electrical machine with a resolver device, wherein
the rotating electrical machine is provided with a housing, a stator built in the housing, and a rotor built in the housing, wherein
the resolver device according to claim 3, is fixed to the housing, and wherein
the resolver rotor rotates according to the rotation of the rotor of the rotating electrical machine.

18. A rotating electrical machine with a resolver device, wherein
the rotating electrical machine is provided with a housing, a stator built in the housing, and a rotor built in the housing, wherein
the resolver device according to claim 5, is fixed to the housing, and wherein the resolver rotor rotates according to the rotation of the rotor of the rotating electrical machine.

19. A rotating electrical machine with a resolver device, wherein
the rotating electrical machine is provided with a housing, a stator built in the housing, and a rotor built in the housing, wherein
the resolver device according to claim 9, is fixed to the housing, and wherein
the resolver rotor rotates according to the rotation of the rotor of the rotating electrical machine.

20. A rotating electrical machine with a resolver device, wherein
the rotating electrical machine is provided with a housing, a stator built in the housing, and a rotor built in the housing, wherein
the resolver device according to claim 12, is fixed to the housing, and wherein
the resolver rotor rotates according to the rotation of the rotor of the rotating electrical machine.

* * * * *